(12) United States Patent
Hotelling et al.

(10) Patent No.: US 7,599,044 B2
(45) Date of Patent: Oct. 6, 2009

(54) METHOD AND APPARATUS FOR REMOTELY DETECTING PRESENCE

(75) Inventors: Steve P. Hotelling, San Jose, CA (US); Scott A. Brenneman, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 411 days.

(21) Appl. No.: 11/165,958

(22) Filed: Jun. 23, 2005

(65) Prior Publication Data

US 2006/0290921 A1    Dec. 28, 2006

(51) Int. Cl.
*G01B 11/26* (2006.01)
(52) U.S. Cl. .................. 356/3.12; 356/152.2; 356/28; 356/141.1
(58) Field of Classification Search ... 356/152.1–152.3, 356/3–3.16
See application file for complete search history.

(56) References Cited

U.S. PATENT DOCUMENTS

| | | | |
|---|---|---|---|
| 4,115,865 A | 9/1978 | Beauvais et al. | |
| 4,449,193 A | 5/1984 | Tournois | |
| 4,484,346 A | 11/1984 | Sternberg et al. | |
| 4,532,606 A | 7/1985 | Phelps | |
| 4,559,618 A | 12/1985 | Houseman et al. | |
| 4,564,952 A | 1/1986 | Karabinis et al. | |
| 4,581,760 A | 4/1986 | Schiller et al. | |
| 4,594,673 A | 6/1986 | Holly | |
| 4,622,653 A | 11/1986 | McElroy | |
| 4,669,054 A | 5/1987 | Schlunt et al. | |
| 4,670,858 A | 6/1987 | Almy | |
| 4,694,404 A | 9/1987 | Meagher | |
| 4,695,973 A | 9/1987 | Yu | |
| 4,758,982 A | 7/1988 | Price | |
| 4,783,829 A | 11/1988 | Miyakawa et al. | |
| 4,794,559 A | 12/1988 | Greenberger | |
| 4,825,391 A | 4/1989 | Merz | |
| 4,841,467 A | 6/1989 | Ho et al. | |
| 4,847,789 A | 7/1989 | Kelly et al. | |
| 4,888,583 A | 12/1989 | Ligocki et al. | |

(Continued)

FOREIGN PATENT DOCUMENTS

EP    0166577    1/1986

(Continued)

OTHER PUBLICATIONS

Akeley, K., "RealityEngine Graphics", Computer Graphics Proceedings, Annual Conference Series, pp. 109-116, Aug. 1-6, 1993.
Angel, E., "Interactive Computer Graphics: A Top-Down Approach with OpenG1", ISBN: 0201855712, Addison-Wesley, pp. 241, 242, 277 and 278, 1997.
Carpenter, L., "The A-buffer, An Antialaised Hidden Surface Method", Computer Graphics, vol. 18, No. 3, pp. 103-108, Jul. 1984.
Clark, J., "Hierarchical Geometric Models for Visible Surface Algorithms", Communications of the ACM, vol. 19, No. 10, pp. 547-554, Oct. 1976.

(Continued)

*Primary Examiner*—Thomas H. Tarcza
*Assistant Examiner*—Timothy A Brainard
(74) *Attorney, Agent, or Firm*—Dorsey & Whitney LLP

(57) ABSTRACT

An apparatus for detecting a person's presence without requiring the person to provide auditory or tactile input. The invention may be incorporated into an electronic device, such as a desktop computer or notebook computer. The embodiment may employ a variety of radiation emissions to determine when a person enters the embodiment's field of detection and, in response to the person entering, activate the electronic device. This may prove particularly useful where, for example, the electronic device consumes significant power and/or may suffer deleterious effects if left active for too long.

30 Claims, 5 Drawing Sheets

U.S. PATENT DOCUMENTS

| | | | |
|---|---|---|---|
| 4,888,712 A | 12/1989 | Barkans et al. | |
| 4,890,242 A | 12/1989 | Sinha et al. | |
| 4,945,500 A | 7/1990 | Deering | |
| 4,961,581 A | 10/1990 | Barnes et al. | |
| 4,970,636 A | 11/1990 | Snodgrass et al. | |
| 4,996,666 A | 2/1991 | Duluk, Jr. | |
| 4,998,286 A | 3/1991 | Tsujiuchi et al. | |
| 5,031,038 A | 7/1991 | Guillemot et al. | |
| 5,040,223 A | 8/1991 | Kamiya et al. | |
| 5,050,220 A | 9/1991 | Marsh et al. | |
| 5,054,090 A | 10/1991 | Knight et al. | |
| 5,067,162 A | 11/1991 | Driscoll, Jr. et al. | |
| 5,083,287 A | 1/1992 | Obata et al. | |
| 5,123,084 A | 6/1992 | Prevost et al. | |
| 5,123,085 A | 6/1992 | Wells et al. | |
| 5,128,888 A | 7/1992 | Tamura et al. | |
| 5,129,051 A | 7/1992 | Cain | |
| 5,129,060 A | 7/1992 | Pfeiffer et al. | |
| 5,133,052 A | 7/1992 | Bier et al. | |
| 5,146,592 A | 9/1992 | Pfeiffer et al. | |
| 5,189,712 A | 2/1993 | Kajiwara et al. | |
| 5,245,700 A | 9/1993 | Fossum | |
| 5,247,586 A | 9/1993 | Gobert et al. | |
| 5,265,222 A | 11/1993 | Nishya et al. | |
| 5,278,948 A | 1/1994 | Luken, Jr. | |
| 5,289,567 A | 2/1994 | Roth | |
| 5,293,467 A | 3/1994 | Buchner et al. | |
| 5,295,235 A | 3/1994 | Newman | |
| 5,299,139 A | 3/1994 | Baisuck et al. | |
| 5,315,537 A | 5/1994 | Blacker | |
| 5,319,743 A | 6/1994 | Dutta et al. | |
| 5,338,200 A | 8/1994 | Olive | |
| 5,343,284 A * | 8/1994 | Keeler et al. | 356/4.01 |
| 5,347,619 A | 9/1994 | Erb | |
| 5,363,475 A | 11/1994 | Baker et al. | |
| 5,369,734 A | 11/1994 | Suzuki et al. | |
| 5,394,516 A | 2/1995 | Winser | |
| 5,402,532 A | 3/1995 | Epstein et al. | |
| 5,448,690 A | 9/1995 | Shiraishi et al. | |
| 5,455,900 A | 10/1995 | Shiraishi et al. | |
| 5,481,669 A | 1/1996 | Poulton et al. | |
| 5,493,644 A | 2/1996 | Thayer et al. | |
| 5,509,110 A | 4/1996 | Latham | |
| 5,535,288 A | 7/1996 | Chen et al. | |
| 5,544,306 A | 8/1996 | Deering et al. | |
| 5,546,194 A | 8/1996 | Ross | |
| 5,572,634 A | 11/1996 | Duluk, Jr. | |
| 5,574,835 A | 11/1996 | Duluk, Jr. et al. | |
| 5,574,836 A | 11/1996 | Broemmelsiek | |
| 5,579,455 A | 11/1996 | Greene et al. | |
| 5,596,686 A | 1/1997 | Duluk, Jr. | |
| 5,613,050 A | 3/1997 | Hochmuth et al. | |
| 5,621,866 A | 4/1997 | Murata et al. | |
| 5,623,628 A | 4/1997 | Brayton et al. | |
| 5,664,071 A | 9/1997 | Nagashima | |
| 5,669,010 A | 9/1997 | Duluk, Jr. | |
| 5,684,939 A | 11/1997 | Foran et al. | |
| 5,699,497 A | 12/1997 | Erdahl et al. | |
| 5,710,876 A | 1/1998 | Peercy et al. | |
| 5,734,806 A | 3/1998 | Narayanaswami | |
| 5,751,291 A | 5/1998 | Olsen et al. | |
| 5,767,589 A | 6/1998 | Lake et al. | |
| 5,767,859 A | 6/1998 | Rossin et al. | |
| 5,778,245 A | 7/1998 | Papworth et al. | |
| 5,798,770 A | 8/1998 | Baldwin | |
| 5,828,378 A | 10/1998 | Shiraishi | |
| 5,841,447 A | 11/1998 | Drews | |
| 5,850,225 A | 12/1998 | Cosman | |
| 5,852,451 A | 12/1998 | Cox et al. | |
| 5,854,631 A | 12/1998 | Akeley et al. | |
| 5,860,158 A | 1/1999 | Pai et al. | |
| 5,864,342 A | 1/1999 | Kajiya et al. | |
| 5,870,095 A | 2/1999 | Albaugh et al. | |
| RE36,145 E | 3/1999 | DeAguiar et al. | |
| 5,880,736 A | 3/1999 | Peercy et al. | |
| 5,889,997 A | 3/1999 | Strunk | |
| 5,900,863 A * | 5/1999 | Numazaki | 345/158 |
| 5,920,326 A | 7/1999 | Rentschler et al. | |
| 5,936,629 A | 8/1999 | Brown et al. | |
| 5,949,424 A | 9/1999 | Cabral et al. | |
| 5,949,428 A | 9/1999 | Toelle et al. | |
| 5,977,977 A | 11/1999 | Kajiya et al. | |
| 5,977,987 A | 11/1999 | Duluk, Jr. | |
| 5,990,904 A | 11/1999 | Griffin | |
| 6,002,410 A | 12/1999 | Battle | |
| 6,002,412 A | 12/1999 | Schinnerer | |
| 6,031,600 A * | 2/2000 | Winner et al. | 356/3.01 |
| 6,037,970 A * | 3/2000 | Kondo | 348/14.1 |
| 6,046,746 A | 4/2000 | Deering | |
| 6,084,591 A | 7/2000 | Aleksic | |
| 6,111,582 A | 8/2000 | Jenkins | |
| 6,118,452 A | 9/2000 | Gannett | |
| 6,125,972 A * | 10/2000 | French et al. | 188/1.12 |
| 6,128,000 A | 10/2000 | Jouppi et al. | |
| 6,130,663 A * | 10/2000 | Null | 345/158 |
| 6,167,143 A | 12/2000 | Badique | |
| 6,167,486 A | 12/2000 | Lee et al. | |
| 6,201,540 B1 | 3/2001 | Gallup et al. | |
| 6,204,859 B1 | 3/2001 | Jouppi et al. | |
| 6,216,004 B1 | 4/2001 | Tiedemann et al. | |
| 6,228,730 B1 | 5/2001 | Chen et al. | |
| 6,229,553 B1 | 5/2001 | Duluk, Jr. et al. | |
| 6,243,488 B1 | 6/2001 | Penna | |
| 6,243,744 B1 | 6/2001 | Snaman, Jr. et al. | |
| 6,246,415 B1 | 6/2001 | Grossman et al. | |
| 6,259,452 B1 | 7/2001 | Coorg et al. | |
| 6,259,460 B1 | 7/2001 | Gossett et al. | |
| 6,263,493 B1 | 7/2001 | Ehrman | |
| 6,268,875 B1 | 7/2001 | Duluk, Jr. et al. | |
| 6,275,235 B1 | 8/2001 | Morgan, III | |
| 6,285,378 B1 | 9/2001 | Duluk, Jr. | |
| 6,288,730 B1 | 9/2001 | Duluk, Jr. et al. | |
| 6,313,825 B1 * | 11/2001 | Gilbert | 345/156 |
| 6,331,856 B1 | 12/2001 | Van Hook et al. | |
| 6,476,807 B1 | 11/2002 | Duluk, Jr. et al. | |
| 6,525,737 B1 | 2/2003 | Duluk, Jr. et al. | |
| RE38,078 E | 4/2003 | Duluk, Jr. | |
| 6,552,723 B1 | 4/2003 | Duluk, Jr. et al. | |
| 6,577,305 B1 | 6/2003 | Duluk, Jr. et al. | |
| 6,577,317 B1 | 6/2003 | Duluk, Jr. et al. | |
| 6,597,363 B1 | 7/2003 | Duluk, Jr. et al. | |
| 6,614,444 B1 | 9/2003 | Duluk, Jr. et al. | |
| 6,650,327 B1 | 11/2003 | Airey et al. | |
| 6,671,747 B1 | 12/2003 | Benkual et al. | |
| 6,693,639 B2 | 2/2004 | Duluk, Jr. et al. | |
| 6,697,063 B1 | 2/2004 | Zhu | |
| 6,717,576 B1 | 4/2004 | Duluk, Jr. et al. | |
| 6,771,264 B1 | 8/2004 | Duluk et al. | |
| 7,113,174 B1 * | 9/2006 | Takekawa et al. | 345/173 |
| 2003/0227635 A1 * | 12/2003 | Muller | 356/614 |
| 2004/0128571 A1 * | 7/2004 | Saunders et al. | 713/300 |
| 2004/0130552 A1 | 7/2004 | Duluk, Jr. et al. | |
| 2005/0033571 A1 * | 2/2005 | Huang et al. | 704/231 |
| 2005/0078462 A1 * | 4/2005 | Dando et al. | 361/783 |
| 2005/0216148 A1 * | 9/2005 | Min et al. | 701/29 |
| 2005/0251294 A1 * | 11/2005 | Cerwin | 700/279 |
| 2007/0121102 A1 * | 5/2007 | Marcu | 356/152.1 |

FOREIGN PATENT DOCUMENTS

| | | |
|---|---|---|
| EP | 0870282 | 5/2003 |
| WO | WO 90/04849 | 5/1990 |

WO    WO 95/27263    10/1995

OTHER PUBLICATIONS

Clark et al., "Distributed Proc in High Performance Smart Image Memory", LAMDA 4th Quarter, pp. 40-45, Oct. 1990.
Cook et al., "The Reyes Image Rendering Architecture", Computer Graphics, vol. 21, No. 4, pp. 95-102, Jul. 1987.
Das et al., "A systolic algorithm for hidden surface removal", Parallel Computing, vol. 15, pp. 277-289, 1990.
Deering et al., "Leo: A System for Cost Effective 3D Shaded Graphics", Computer Graphics Proceedings, Annual Conference Series, pp. 101-108, Aug. 1-6, 1993.
Demetrescu S., "High Speed Image Rasterization Using a Highly Parallel Smart Bulk Memory", Stanford Tech Report, pp. 83-244, Jun. 1983.
Demetrescu, S., "High Speed Image Rasterization Using Scan Line Access Memories", Chapel Hill Conference on VLSI, pp. 221-243, 1985.
Duluk et al., "VLSI Processors for Signal Detection in SETI", Presented at XXXVIIth International Astronautical Congress, Innsbruck, Austria, Oct. 4-11, 1986.
Foley et al., "Computer Graphics: Principles and Practice", Addison-Wesley Professional, Second Edition, 1990.
Franklin, W., "A Linear Time Exact Hidden Surface Algorithm", Computer Graphics, pp. 117-123, Jul. 1980.
Franklin et al., "Parallel Object-Space Hidden Surface Removal", Computer Graphics, vol. 24, No. 4, pp. 87-94, Aug. 1990.
Fuchs et al., "Pixel-Planes 5: A Heterogeneous Multiprocessor Graphics System Using Processor-Enhanced Memories", Computer Graphics, vol. 23, No. 3, pp. 79-88, Jul. 1989.
Gharachorloo et al., "A Characterization of Ten Rasterization Techniques", Computer Graphics, vol. 23, No. 3, pp. 355-368, Jul. 1989.
Gharachorloo et al., "Super Buffer: A Systolic VLSI Graphics Engine for Real Time Raster Image Generation", Chapel Hill Conference on VLSI, Computer Science Press, pp. 285-305, 1985.
Gharachorloo et al., "Subnanosecond Pixel Rendering with Million Transistor Chips", Computer Graphics, vol. 22, No. 4, pp. 41-49, Aug. 1988.
Gharachorloo et al., "A Million Transistor Systolic Array Graphics Engine", Proceedings of the International Conference on Systolic Arrays, San Diego, CA, pp. 193-202, May 25-27, 1988.
Goris et al., "A Configurable Pixel Cache for Fast Image Generation", IEEE Computer Graphics & Applications, Mar. 1987.
Greene et al., "Hierarchial Z-Buffer Visibility", Computer Graphics Proceedings, Annual Conference Series, pp. 231-238, Aug. 1-6, 1993.
Gupta et al., "A VLSI Architecture for Updating Raster-Scan Displays", Computer Graphics, vol. 15, No. 3, pp. 71-78, Aug. 1981.
Gupta, S., "PS: Polygon Streams, A Distributed Architecture for Incremental Computation Applied to Graphics", Advances in Computer Graphics Hardware IV, ISBN 0387534733, Springer-Verlag, pp. 91-111, May 1, 1991.
Hall, E., "Computer Image Processing and Recognition", Academic Press, pp. 468-484, 1979.
Hu et al., "Parallel Processing Approaches to Hidden-Surface Removal in Image Space", Computer and Graphics, vol. 9, No. 3, pp. 303-317, 1985.
Hubbard, P., "Interactive Collision Detection", Brown University, ACM SIGGRAPH 94, Course 2, Jul. 24-29, 1994.
Jackel, D. "The Graphics PARCUM System: A 3D Memory Based Computer Architecture for Processing and Display of Solid Models", Computer Graphics Forum, vol. 4, pp. 21-32, 1985.
Kaplan et al., "Parallel Processing Techniques for Hidden Surface Removal" SIGGRAPH 1979 Conference Proceedings, p. 300.
Kaufman, A., "A Two-Dimensional Frame Buffer Processor", Advances in Com. Graphics Hardware II, ISBN 0-387-50109-6, Springer-Verlag, pp. 67-83.
Lathrop, "The Way Computer Graphics Work", Chapter 7: Rendering (converting a scene to pixels), Wiley Computer Publishing, John Wiley & Sons, Inc., pp. 93-150, 1997.

Linscott et al., "Artificial Signal Detectors," International Astronomical Union Colloquium No. 99, Lake Balaton, Hungary, Stanford Universtiy, Jun. 15, 1987.
Linscott et al., "Artificial Signal Detectors," Bioastronomy—The Next Steps, pp. 319-355, 1988.
Linscott et al., "The MCSA II—A Broadband, High Resolution, 60 Mchannel Spectrometer," Nov. 1990.
Naylor, B., "Binary Space Partitioning Trees, A Tutorial", (included in the course notes Computational Representations of Geometry), Course 23, ACM SIGGRAPH 94, Jul. 24-29, 1994.
Nishizawa et al., "A Hidden Surface Processor for 3-Dimension Graphics", IEEE, ISSCC, pp. 166-167 and 351, 1988.
Ohhashi et al., "A 32b 3-D Graphics Processor Chip with 10M Pixels/s Gouraud Shading", IEEE, ISSCC, pp. 168-169 and 351, 1988.
Oldfield et al., "Content Addressable Memories for Storing and Processing Recursively Subdivided Images and Trees", Electronics Letters, vol. 23, No. 6, pp. 262-263, Mar. 1987.
Parke, F., "Simulation and Expected Performance of Multiple Processor Z-Buffer Systems", SIGGRAPH '80 Conference Proceedings, pp. 48-56, 1980.
Peercy, et al., "Efficient Bump Mapping Hardware", Computer Graphics Proceedings, Annual Conference Series, pp. 303-306, Aug. 3-8, 1997.
Pineda, J., "A Parallel Algorithm for Polygon Rasterization", SIGGRAPH 1988 Conference Proceedings, Aug. 1988.
Potmesil et al., "The Pixel Machine: A Highly Parallel Image Computer", Computer Graphics, vol. 23, No. 3, pp. 69-78, Jul. 1989.
Poulton et al. "Pixel-Planes: Building a VLSI-Based Graphic System", Chapel Hill Conference on VLSI, Computer Science Press, Inc., pp. 35-60, 1985.
Rao et al., "Discrete Cosine Transform: Algorithms, Advantages, Applications," Academic Press, Inc., pp. 242-247, 1990.
Rossignac et al., "Depth-Buffering Display Techniques for Constructive Solid Geometry", IEEE, Computer Graphics & Applications, pp. 29-39, Sep. 1986.
Samet et al., "Data Structures 59: Hierarchical Data Structures and Algorithms for Computer Graphics", IEEE, Computer Graphics & Applications, pp. 59-75, Jul. 1988.
Schilling et al., "Texram: a Smart Memory for Texturing", IEEE, Computer Graphics and Applications, pp. 32-41, May 1996.
Schneider, B., "Towards A Taxonomy for Display Processors", Advances in Computer Graphics Hardware IV, ISBN 0387534733, Springer-Verlag, pp. 91-111, May 1, 1991.
Schneider et al., "Advances In Computer Graphics Hardware III", Chapter 9, Proof: An Architecture for Rendering in Object Space, ISBN 0387534881, Springer-Verlag, pp. 67-83, Jun. 1, 1991.
Segal, "Hardware sorting chip steps up software pace", Electronic Design, vol. 34, No. 15, pp. 85-91, Jun. 26, 1986.
Shepard et al., "Real-time Hidden Surface Removal in a Flight Simulator", Proceedings of the Pacific Rim Conference on Communications, Compute and Signal Processing, Victoria, CA, pp. 607-610, May 9-10, 1991.
Soderberg et al., "Image Generation Design for Ground-Based Network Training Environments", International Training Equipment Conference, London, May 4-6, 1993.
Sutherland et al., "A Characterization of ten Hidden-Surface Algorithms" Computing Surveys, vol. 6, No. 1, pp. 1-55, Mar. 1974.
Torborg, G., "A Parallel Processor Architecture for Graphics Arithmetic Operations", Computer Graphics, vol. 21, No. 4,, pp. 197-204, Jul. 1987.
Warnock, "A Hidden Surface Algorithm for Computer Generated Halftone Pictures", Univerity of Utah Doctoral Thesis, 1969.
Watt, 3D Computer Graphics, "Chapter 4: Reflection and Illumination Models", 2nd Edition, Addison-Wesley, pp. 89-126, 1993.
Weiler et al., "Hidden Surface Removal Using Polygon Area Sorting", vol. 11, No. 2, pp. 214-222, Jul. 1977.
Whelan, D., "A Rectangular Area Filling Display System Architecture", Computer Graphics, vol. 16, No. 3, pp. 147-153, Jul. 1982.

* cited by examiner

METHOD AND APPARATUS FOR REMOTELY DETECTING PRESENCE

BACKGROUND OF THE INVENTION

1. Technical Field

The present invention relates generally to presence detection, and more specifically to a method and apparatus for remotely detecting a person's presence without requiring physical input by the person.

2. Background Art

Computing systems have grown in complexity, and thus in power consumption. Indeed, many electronic devices are remarkably more sophisticated than their counterparts from a decade ago, or even several years ago. As devices offer additional functionality, users have come to expect even more enhancements.

Generally speaking, such enhancements come at a price. First, power requirements for electronics may increase with complexity and function. Second, the increasing sophistication of consumer electronics may cause many potential purchasers to avoid too-complex products, fearing such products will prove difficult to use. Third, with increase in complexity and sophistication of electronic products comes an increased premium in the space available to incorporate additional features and designs. Space within a product may be extremely limited, and thus valuable.

Further, many electronic products operate on battery power. Enhancing the battery life may prove useful and desirable to consumers, as the product will more likely be available when the consumer desires its use. Thus, there is a need in the art for a method for improving battery life of an electronic product.

Improved operating experiences with electronic products may minimize a consumer's fear of a product's complexity. Enhanced user interfaces are one example of how to improve an operating experience. Yet another is personalization of a product, as is implementing a manner for a product to recognize a user's presence. Accordingly, there is a need in the art for recognizing a user's presence and accustoming the user to the activation of the product.

Additionally, the function of aesthetics in a purchaser's decision to choose one product over another should not be underestimated. Many consumers, when faced with two virtually identical products, will choose the "prettier" or better-looking product. Many consumers find smooth, uniform surfaces particularly attractive, especially in electronic products. With the proliferation of remote controls, windows or ports must be placed in products to receive a signal from the remote control. Similarly, many products (such as televisions, computer monitors, and even some remote controls) automatically adjust their brightness to account for a level of ambient light. Light sensors are required for such activities, and in turn require yet another port or opening in the surface of the electronic product. The inclusion of too many of these ports may detract from the overall look of the product, thus swaying a potential purchaser to buy a different, competing product. Accordingly, there is a need in the art for an apparatus that may combine the functions of several sensors in a single element.

That the present invention satisfies these needs will be apparent to one of ordinary skill in the art upon reading this disclosure.

BRIEF SUMMARY OF THE INVENTION

Generally, one embodiment of the present invention takes the form of an apparatus for detecting a person's presence without requiring the person to provide auditory or tactile input. For example, an embodiment of the present invention may be incorporated into an electronic device, such as a desktop computer or notebook computer. The embodiment may employ a variety of radiation emissions to determine when a person enters the embodiment's field of detection and, in response to the person entering, activate the electronic device. This may prove particularly useful where, for example, the electronic device consumes significant power and/or may suffer deleterious effects if left active for too long. When used in a notebook or desktop computer, for example, the embodiment may minimize power consumption by permitting the notebook to sleep and yet provide convenience for a user by automatically waking the notebook as the user approaches. Not only does this eliminate any requirement for the user to tap a key, press a mouse button, or otherwise interact with the computer, but it may provide an enhanced user experience upon approaching the computer.

Another embodiment of the present invention includes a method for detecting a presence, comprising receiving a beam having an angle of reflection; determining from the angle of reflection if an object reflecting the beam is within a detection field; and in the event the object is within the detection field, activating a related device. The method may further include emitting the beam at an exit angle from an emitter, and/or receiving the beam at an entry angle at a detector. Additionally, the method may determine the angle of reflection from the exit angle and the entry angle. The method may determine the angle of reflection by adding the exit angle to the entry angle to yield a sum, and equating the angle of reflection to the sum. Further, the method may compare the angle of reflection to a minimum angle of reflection, and, in the event the angle of reflection at least one of equals or exceeds the minimum angle of reflection, determine the object is within the detection field.

Another embodiment of the present invention may take the form of an apparatus for detecting a presence, comprising an emitter operative to project a beam, a detector operative to receive the beam, and a logic operative to determine whether the beam is reflected from an object within a detection field associated with the emitter. In such an embodiment, the emitter may include a plurality of light-emitting diodes arranged in an emitter pattern, the detector may include a plurality of sensors arranged in a detector pattern complementary to the pattern of the emitter, and the detector may be operative to scan at least a first sensor upon actuation of one of the plurality of light-emitting diodes.

Additional features and advantages of the present invention will become apparent to those of ordinary skill in the art upon reading the entirety of the disclosure.

DETAILED DESCRIPTION OF THE INVENTION

1. Introduction

Generally, one embodiment of the present invention takes the form of an apparatus for detecting a person's presence without requiring the person to provide auditory or tactile input. For example, an embodiment of the present invention may be incorporated into an electronic device, such as a desktop computer or notebook computer. The embodiment may employ a variety of radiation emissions to determine when a person enters the embodiment's field of detection and, in response to the person entering, activate the electronic device. This may prove particularly useful where, for example, the electronic device consumes significant power and/or may suffer deleterious effects if left active for too long. When used in a notebook or desktop computer, for example, the embodiment may minimize power consumption by permitting the notebook to sleep and yet provide convenience for a user by automatically waking the notebook as the user approaches. Not only does this eliminate any requirement for the user to tap a key, press a mouse button, or otherwise interact with the computer.

An approaching entity generally constitutes a "presence." Embodiments of the present invention are configured to detect a presence and ignore nearby, stationary objects.

2. First Embodiment of the Invention

Figure 1:
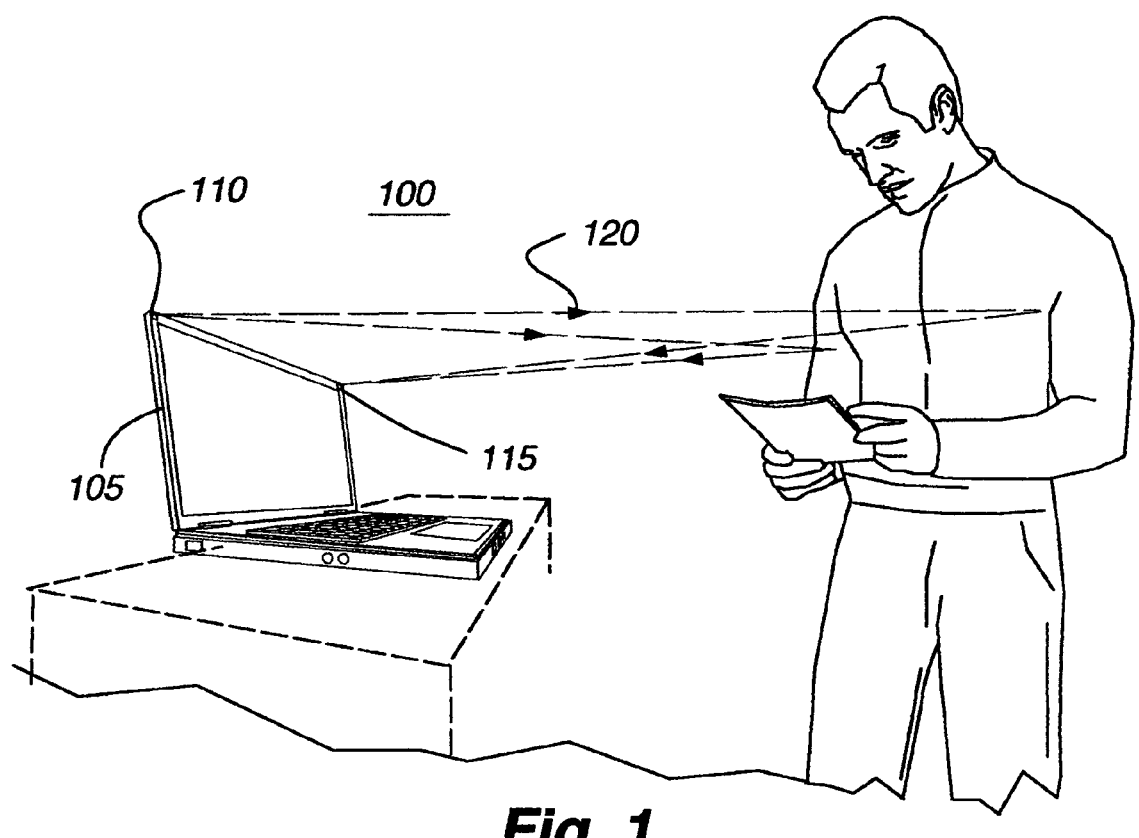
FIG. 1 depicts a first embodiment of the present invention in operation.
Figure 2:
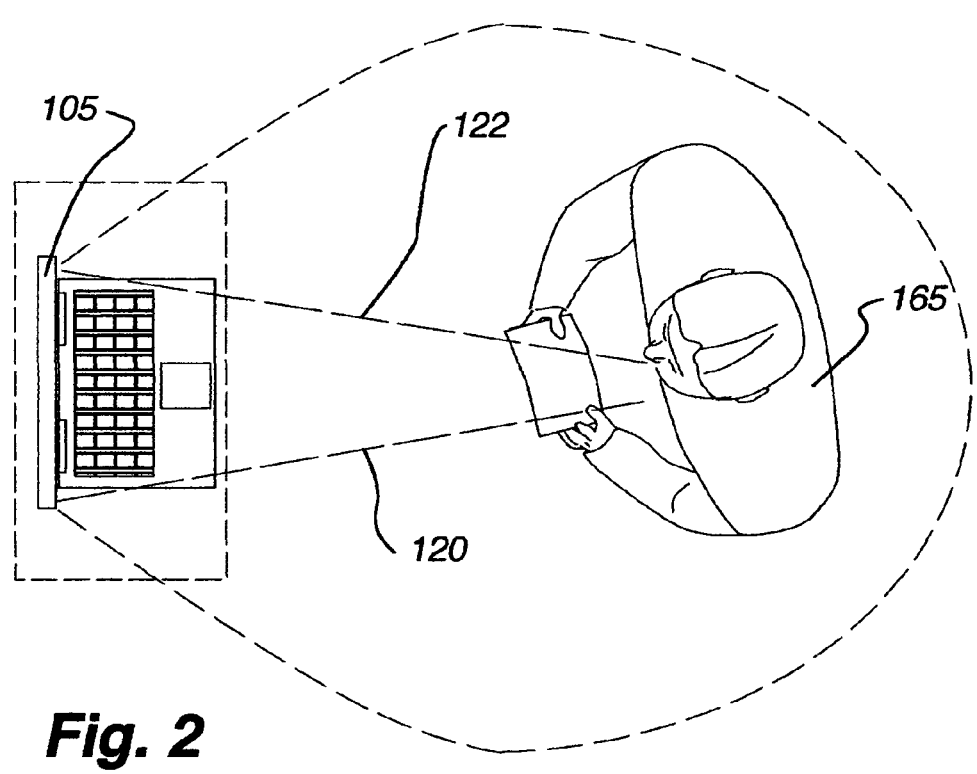
FIG. 2 depicts a top-down view of the embodiment of FIG. 1.

FIGS. 1 and 2 depict a first embodiment 100 of the inventions placed in a notebook computer 105. Here, the notebook computer is an example of a "related device." Generally, the embodiment includes an emitter 110 and a detector 115. Infrared beams 120 are projected by the emitter 110 and received by the detector 115 after reflecting from an object within the embodiment's detection field 125. The detection field may be one-dimensional (linear), two dimensional (planar), or three-dimensional depending upon the configuration of the emitter and detector. Alternative embodiments of the present invention may emit a variety of radiation, such as ultraviolet light or any other light frequency. Yet other embodiments may employ acoustic reflection, such as SONAR, or a steered infrared laser in place of the emitter array described herein.

The infrared beams 120 projected by the emitter 110 define a volume of sensitivity, referred to herein as a "detection field" 122. The exact dimensions of the detection field are determined by the radiation emitted and configuration of the emitter, and thus may vary between embodiments. One particular embodiment 100 employs a detection field 122 having a depth of approximately one and a half meters and a width of approximately three-tenths of a meter. The detection field 122 may be generally rectangular, or may resemble a truncated cone, with the embodiment at the smallest portion of the truncated cone. The depth of the detection field may be referred to as the field's "depth threshold."

Although the embodiment 100 may employ a relatively deep detection field 122, many embodiments may limit the depth of the field in order to reduce activations caused by people passing by the embodiment (and thus through the field) without intending to actually approach or use the embodiment or related device. By limiting the depth of the field, false positives caused by reflection and detection of the emitted beams 120 may likewise be reduced. One exemplary method to limit the depth of field 122 is discussed in more detail below.

3. Emitter

Figure 4:
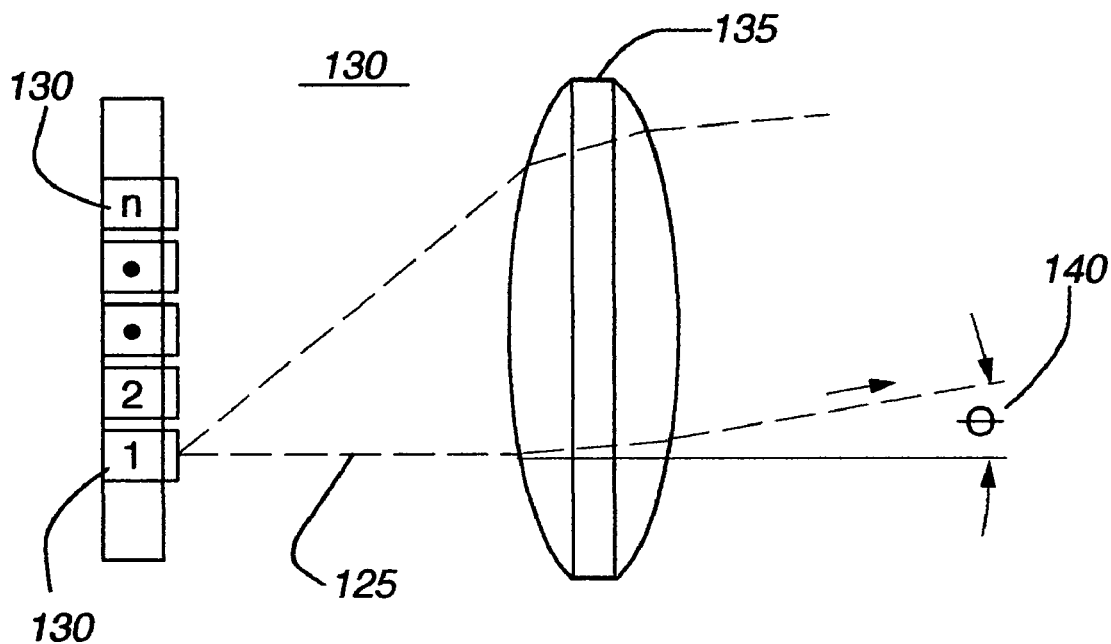
FIG. 4 depicts an exemplary emitter for use in the embodiment of FIG. 1.

FIG. 4 depicts an exemplary emitter array 110. The emitter 110 includes a number of light-emitting diodes 130 (LEDs). Each LED 130 projects infrared radiation as a series of beams 125 in a conical pattern. The infrared radiation passes through a lens 135, which bends the beams and establishes a uniform exit angle $\theta$ 140. Typically, the exit angle $\theta$ 140 may vary between $-30°$ and $30°$ in ten degree increments, although alternative embodiments may vary the range of the exit angle, the incrementation of the angles, or both.

Although FIG. 4 depicts a linear array of LEDs 130 in the emitter 110, alternative embodiments may vary the number and configuration of the LEDs. For example, a single LED 130 may be used, or a matrix of LEDs may be used. Accordingly, while the shape and configuration of the LEDs will naturally affect the dimensions of the detection field 125, it should be understood that different embodiments may employ any number of LEDs in any configuration without departing from the spirit or scope of the present invention.

Figure 3:
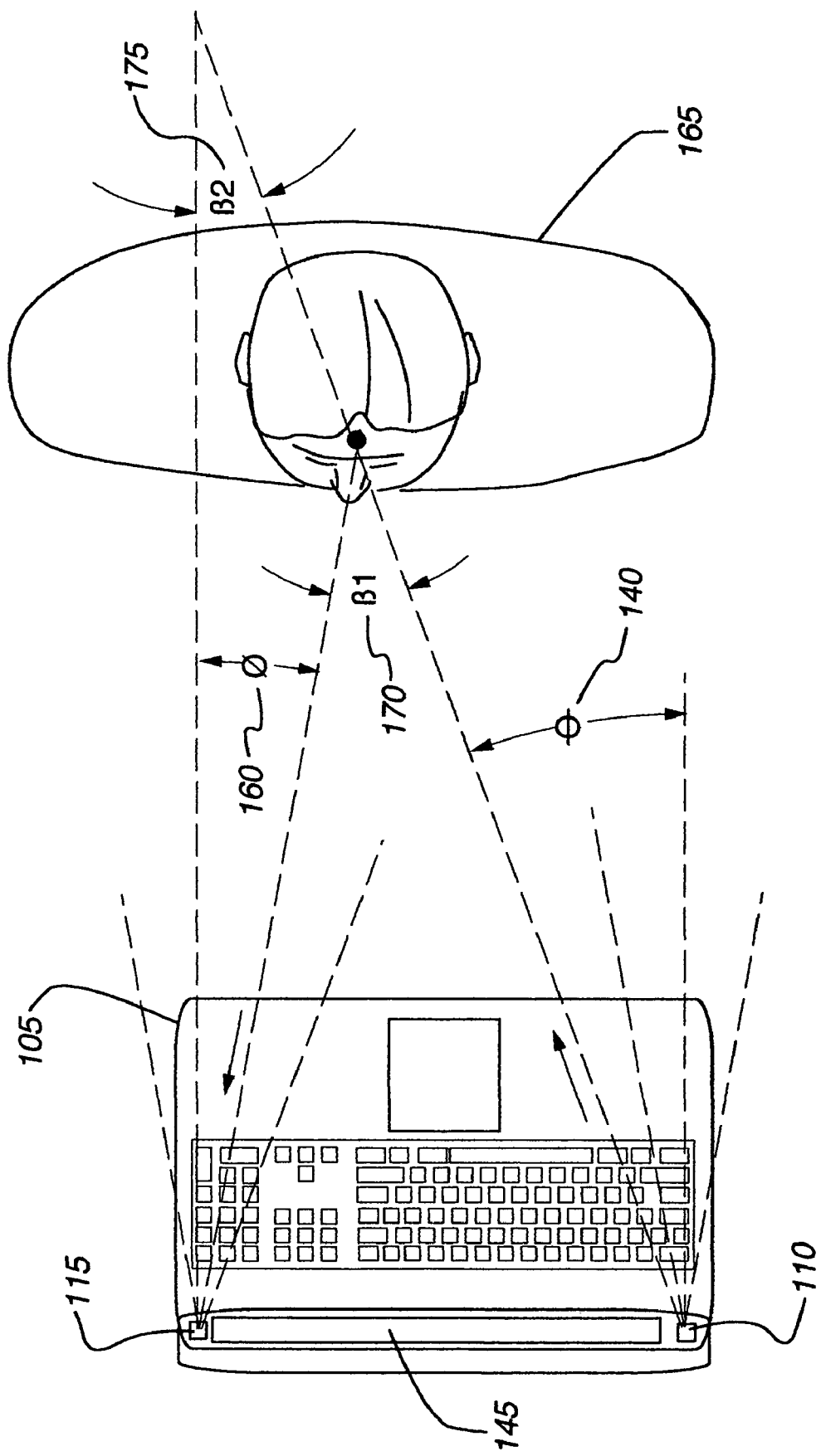
FIG. 3 depicts a top-down view of the embodiment of FIG. 1, depicting an exit angle, entry angle, and angle of reflection.

As shown in FIG. 3, the emitter 110 may be placed at one corner of a notebook computer 105, for example just above and to the left of the computer's display 145. To continue the current example, a detector 115 may be positioned opposite the emitter 110, such as to the right and above the computer's display 145. By placing the emitter and detector at opposite ends of the computer, a relatively wide detection field may be established fairly simply.

4. Detector

Figure 5:
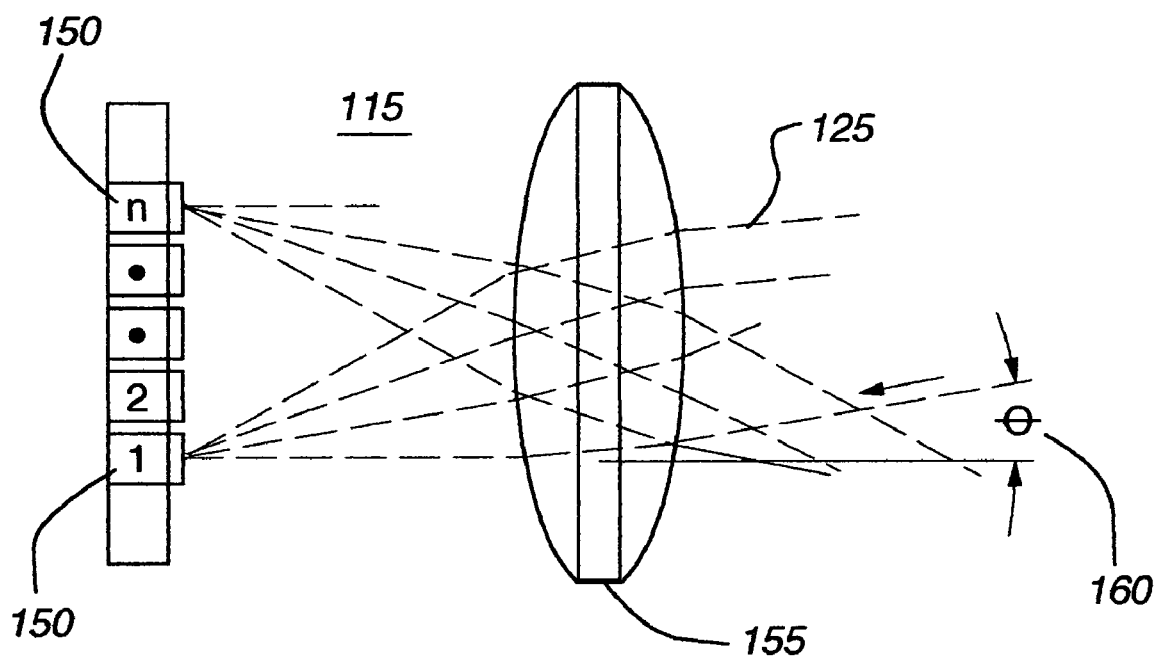
FIG. 5 depicts an exemplary detector for use in the embodiment of FIG. 1.

FIG. 5 depicts an exemplary detector 115 for use in the present invention. The detector 115 includes a number of infrared sensors 150, which may be of any type known to those of ordinary skill in the art. One exemplary sensor 150 is a photodiode. The detector generally is made of a series of infrared sensors configured to match the configuration of the emitter's LEDs 130. Thus, if the emitter 110 includes 10 LEDs 130 arranged linearly, the detector 115 will include 10 sensors 150 in the same linear arrangement.

As with the emitter 110, the detector 115 includes a lens. Here, however, the emitter lens 155 focuses all infrared beams 125 entering the lens to one of the sensors 150. The sensor to which the beam is focused depends in part on the beam's entry angle $\phi$ 160. Beams with entry angles within a first range will be focused to the first sensor, within a second range to the second sensor, and so on. The range of the entry angle $\phi$ 160 corresponding to each sensor 150 is determined by the physical properties of the lens 155, as known to those skilled in the art. Accordingly, different lenses 155 may be selected for use in different embodiments, and may be chosen at least in part based on the configuration of the sensors 150 in the detector 115.

As with the exit angle 140, the entry angle $\phi$ 160 typically varies between $30°$ and $30°$ in ten degree increments. Alternative embodiments may change the range of entry angles available, the incrementation thereof, or both.

Figure 8:
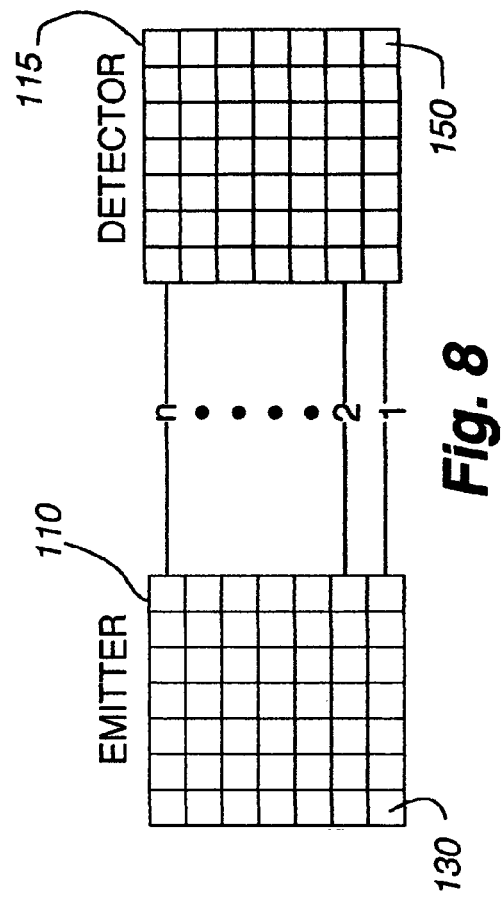
FIG. 8 depicts an exemplary two-dimensional emitter array and exemplary two-dimensional detector array.

FIG. 8 depicts an exemplary two-dimensional emitter 110 and detector 115, each having the same number of rows and columns. Generally speaking, as each row of LEDs 130 in the emitter 110 activates, the corresponding row of the detector 115 is scanned to determine whether a reflected beam 125 is received by a sensor 150. The embodiment 100 thus cycles through both the emitter and detector rows and columns, sequentially firing the LEDs and scanning the appropriate sensor rows Some embodiments may additionally scan a row of sensors 150 above and/or below the row corresponding to the firing LED 130. In this manner, the embodiment may account for lens imperfections that would otherwise blur the emitted beam.

5. Operation of the Embodiment

The general operation of the embodiment 100 will now be described. The emitter 110 projects the infrared beam 125 in a pulse train, cycling through each of the LEDs 130. By employing a pulse train, the embodiment 100 may assure that infrared beams 120 emitted by the LEDs 130 do not interfere with one another, which may cause scattering, diffusion, and an inability to be reflected to the detector 115. In one embodiment of the present invention, the emitter fires the LEDs in a twelve-pulse train at about 200 kilohertz.

The detector 115 receives a beam 125 or beams reflected from an object 165 within the detection field 122 at one of the sensors. (Alternative embodiments may receive a reflected beam at multiple sensors by varying the focusing lens' physical properties, or by varying the distance between the focusing lens 155 and sensor array.) The detector receives the beam, demodulates it, and stores the data on the detected beam. Typically, the stored data will include a signal/beam's angle of exit θ 140 and angle of entry φ 160. For reference, stored data with these parameters may be referred to as "signal (θ,φ)." The signal data may be stored, for example, in a memory or on a computer-readable medium. The embodiment 100 employs synchronous demodulation, as known in the art, to screen noise and determine the actual signal received. Insofar as synchronous demodulation is a commonly-known technique, this paper provides no further discussion thereof.

As previously mentioned, it may be advantageous to limit the field of detection for the present embodiment 100. One manner of limiting the field 122 involves determining a minimum angle of reflection 170 for which a body will be considered within the field. As shown in FIG. 3, any object reflecting an infrared beam from the emitter to the detector reflects the beam at an angle β 170. The angle of reflection may be determined by the embodiment as follows.

For every received signal 125, an angle of exit θ 140 and angle of entry φ 160 exist. As previously mentioned, these angles are detected by the sensors 150 and stored with the signal data. Given the angles, the angle of reflection β 170 may be determined. (See FIG. 3 for one example of the various angles.) The angle of reflection β equals the exit angle θ plus the entry angle φ. Calculation of the angle of reflection 170 permits triangulation of the object 165 reflecting the infrared beam. That is, given an exit and entry angle, as well as an angle of reflection, the exact position of the body may be calculated. A single point within the detection field 122 may provide each angle of reflection for a given combination of entry and exit angle.

The angle of reflection 170 may be used to determine whether the object 165 from which the beam 125 is reflected is within the depth field 122. (The infrared beams, in many cases, may project further than the desired depth field, permitting reflection from targets that are actually outside the desired depth field.) A minimum acceptable reflection angle β 175 may be calculated by the embodiment 100, based on the distance between the emitter 110 and detector 115 (i.e., width of the detection field) and desired depth of the detection field 122. Generally, the minimum acceptable angle β 175 will occur when the infrared beam 125 emitted by the emitter 110 strikes the opposite corner at the maximum depth of the detection field 122. This minimum acceptable angle is related to the depth threshold for the embodiment. In FIG. 3, this particular angle of reflection is labeled as β2.

To elaborate, presume the parameters of the detection field 122 are a width of 0.3 meters and a maximum depth threshold of 1.5 meters, as discussed above. Thus, the minimum acceptable reflection angle β2 175 would equal the arctangent of the width divided by the depth. In mathematical terms:

$$\beta2 = A\,TAN(0.3/1.5)$$

or β2 equals approximately eleven degrees. Accordingly, an angle of reflection 170 less than eleven degrees indicates a reflection from an object 165 outside the desired depth of the detection field 122, while an angle of reflection greater than (or equal to) eleven degrees indicates a reflection of an infrared beam 125 from an object within the desired depth of the detection field. In this manner, the embodiment 100 may treat any beam reflected by an object outside the desired depth of the detection field as a false positive. Essentially, such reflected beams are ignored.

By limiting the maximum depth of the detection field 122 as described above, the embodiment 100 may prevent false activations of the related device 105 due to background movement. It should be noted that certain embodiments may conservatively estimate the minimum angle of reflection 175. Such embodiments may, for example, reduce the minimum allowable angle of reflection, thus effectively extending or "padding" the depth of the detection field. Continuing the example above, an embodiment may determine the minimum angle of reflection 175 to be eleven degrees, but only ignore reflected beams 125 having an angle of reflection 170 less than nine degrees.

Although detection of objects within the detection field 122 and within the desired depth is useful, such detection may not suffice alone. For example, an emitted infrared beam 125 may reflect off a chair or other piece of furniture, a plant, or another stationary object 165 within the detection field and inside the depth threshold. Accordingly, it may be useful to provide some form of motion detection to screen out beams 125 reflected from stationary objects 165. In such an embodiment, the related device 105 will not wake, or perform any triggered function, unless both the depth threshold and motion detection tests are satisfied.

A variety of motion detection schemes may be used. For example, one or more sensors 150 may look for the reflected beam 125 to intermittently appear and/or disappear, such that the signal from the beam is not continuous. An interrupted or intermittent signal generally corresponds to a reflection from an object 165 that is not constantly in a single position.

Similarly, the embodiment 100 may determine whether a reflected signal is passed from one sensor 150 to another, either an adjacent or non-adjacent sensor. Where the reflected beam is detected sequentially by multiple sensors, it may correspond to an object moving through the detection field 122.

As yet another option, the embodiment 100 may determine if a signal from a reflected beam 125 undergoes changes for at least a minimum period of time. In this manner, the embodiment 100 may acknowledge only signals received by the sensor 150 that continue to change for at least the minimum time, thus screening signals caused by reflections from objects 165 (including people) only briefly within the detection field 122 or immobile objects. Objects that only briefly occupy a volume within the detection field typically do not represent a person approaching the related device 105, and thus should not actuate the device.

In one embodiment, the embodiment 100 may employ a lowpass filter to determine motion. For any reflected beam 125 having an angle of reflection 170 greater than the minimum angle of reflection, the embodiment may subject the corresponding signal to a lowpass filter. For example, an infinite impulse response filter may be employed to calculate a filter value for the signal, as follows:

$$\text{Filtered signal }(\theta,\phi)=[(1/n)(\text{signal }(\theta,\phi))]+[((n-1)/n)(\text{filtered signal }(\theta,\phi))]$$

The filtered signal value is calculated from the stored signal data, including the related exit angle 140 and entry angle 160. Such a response filter acts as a lowpass filter, permitting only signal values below a threshold to pass. Given the value of the filtered signal, the embodiment may determine if the absolute value of the difference between the signal $(\theta,\phi)$ and filtered signal $(\theta,\phi)$ exceeds a threshold constant K. The constant K represents the minimum duration, in seconds, during which the signal must undergo some change in signal strength at the region of interest, or reflecting body. In one embodiment, K equals three seconds. Alternative embodiments may vary the constant K as desired.

If the aforementioned absolute value exceeds or equals K, the embodiment 100 may determine the reflecting object 165 constitutes a presence, and actuate the related device 105. If the absolute value is less than K, then the embodiment may determine the reflecting object does not constitute a presence, in which case the related device is not actuated and the reflected beam is ignored.

Further, the embodiment 100 may optionally compare current values of stored signals and/or reflected beam data to historical signals and/or reflected beam data. By comparing current signal data (such as angles of reflection 170 or other angles, filtered signal values, and so forth) to stored signal data previously determined to indicate a presence, the embodiment 100 may determine whether the current signal data indicates a presence. The embodiment may employ such historical analysis in addition to, or in lieu of, the motion detection and/or object detection operations discussed herein.

Figure 9:
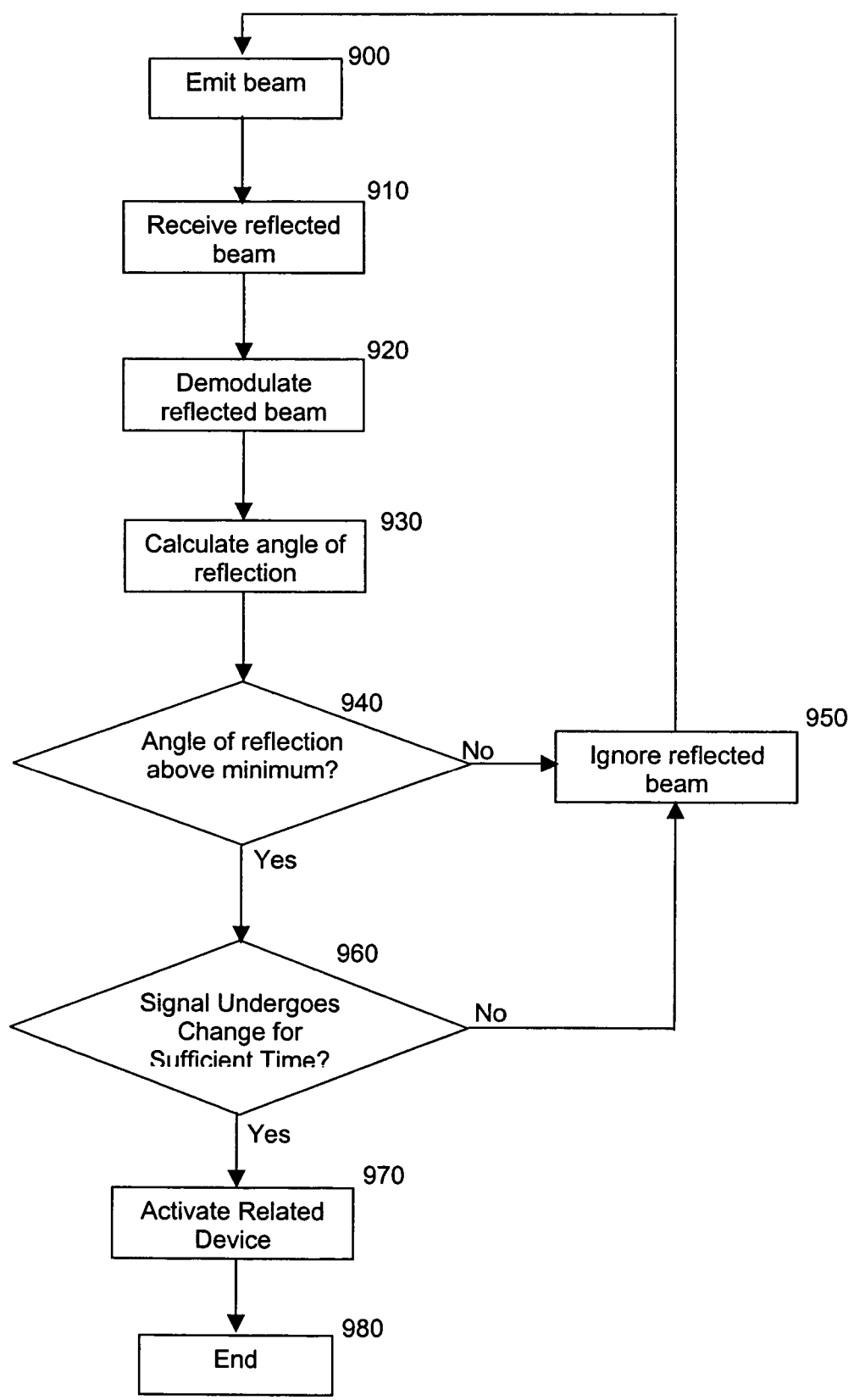
FIG. 9 is a flowchart depicting an operation of an exemplary embodiment of the present invention.

FIG. 9 is a high-level flowchart showing the general operations executed by one particular embodiment of the present invention. First, in operation 900, at least one LED 130 emits a beam 125 of infrared radiation at an exit angle θ 140. In operation 910, a sensor 150 receives a beam reflected from an object 165. In one embodiment, every sensor in the detector array 115 is sampled at each illumination of every single LED in the emitter 110. Since the infrared beam is substantially instantaneously reflected, in this manner the detector receiving the reflected beam may be matched to the LED producing the beam. Thus, both the exit angle θ and entry angle φ may be relatively easily determined. In other words, for each LED activation in the emitter 110, all sensors 150 in the detector 115 are scanned to determine whether the activated LED's beam 125 is reflected.

In operation 920, the reflected beam 125 is demodulated by the embodiment 100 and its signal data (including the exit 140 and entry 160 angles) stored. In operation 930, the exit and entry angles are employed, as described above, to determine the beam's angle of reflection β 170.

Once the angle of reflection β 170 is known, the embodiment 100 may determine in operation 940 whether the angle of reflection β exceeds the minimum angle of reflection 175. If so, then the object 165 reflecting the beam 125 is within the depth threshold of the detection field 122, and operation 960 is accessed. Otherwise, the reflecting object is too far away and the reflected beam is ignored in operation 950.

Following operation 950, the embodiment 100 returns to operation 900 and emits another beam 125 from at least one LED 130 in the emitter 110. Typically, the LED from which a beam is emitted in a subsequent iteration of operation 900 is the LED adjacent to the one employed in the immediately-finished iteration of the method of FIG. 9. In other words, each pass through the method of FIG. 9 causes a different LED 130 to emit an infrared beam 125.

In operation 960, the embodiment 100 determines whether the signal (or reflected beam 125) has undergone a change of state for a sufficient time. The exact manner for making such a determination is discussed above. If the signal's change exceeds the threshold time K, then operation 970 is accessed. Otherwise, the embodiment executes operation 950, as discussed above.

In operation 970, the embodiment 100, having detected a presence, activates the related device 105. This activation may take many forms, from turning the device on to instructing the device to perform a function, to accessing information stored in the device, and so on. As an example, the embodiment 100 may wake the related device 105 from an inactive ("sleep") mode, powering up the device to an active state.

Following operation 970, the method of FIG. 9 ends at end state 980.

The various operations described with respect to FIG. 9, and in particular the determinations of operations 940 and 960, may be performed by dedicated hardware or controlled by appropriate software, or a combination of the two. For example, an integrated circuit may be designed to carry out the logical operations described herein and control operation of the emitter and/or detector.

6. Operating Environment

Figure 6:
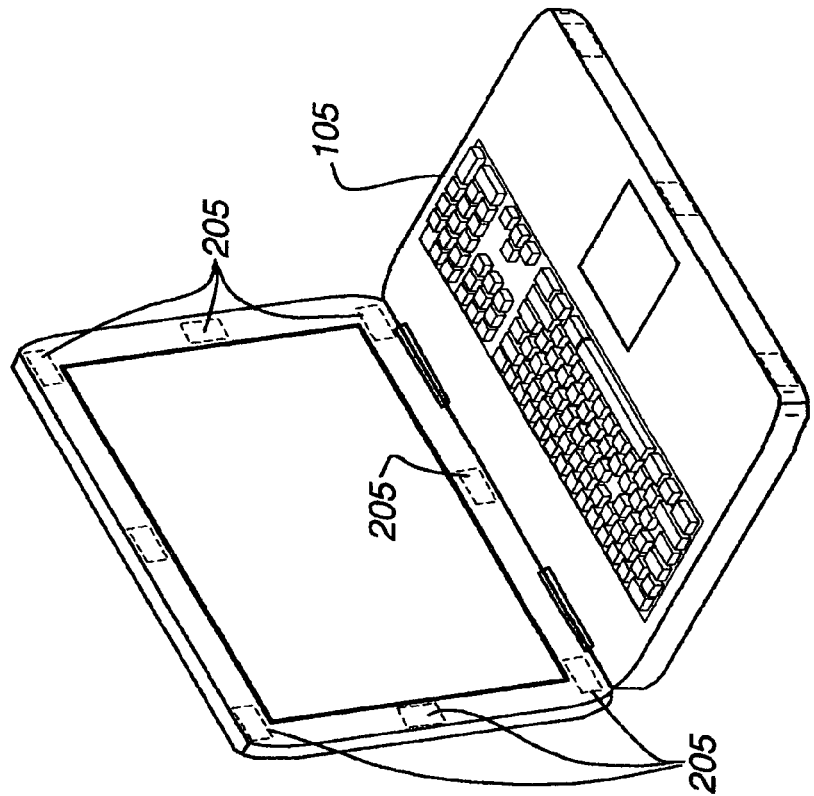
FIG. 6 depicts an exemplary related device for use with the embodiment of FIG. 1, including a variety of positions in which the emitter of FIG. 4 and detector of FIG. 5 may be located.

Embodiments of the present invention may be operationally connected to, or incorporated within, any of a variety of electronic devices (including related devices 105). For example, FIG. 6 depicts a number of possible locations 205 for the emitter 110 and/or detector 115 on the surface of a notebook computer. It should be noted that the emitter and detector may be collocated.

Yet other embodiments may be incorporated into different computing systems, such as desktop computers. Still other embodiments may be incorporated into a variety of other electronic devices, such as televisions, computer monitors, stereo equipment, appliances, and so forth.

Various embodiments of the present invention may be assembled as one or more integrated circuits incorporated into the operating environment. Further, components of the invention, such as the emitter and/or detector, may take the form of dedicated circuitry.

7. Additional Functionality

Figure 7:
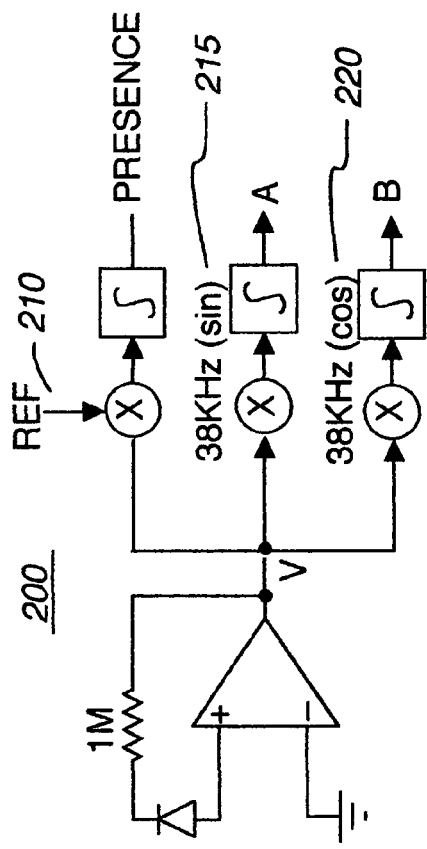
FIG. 7 is a diagram of a circuit for modulating a presence detecting signal with other control signals.

As may be appreciated by those skilled in the art, the present invention may be combined with other features or functions to provide enhanced value when incorporated into a related device 105. For example, the detector 115 may be used not only to determine a presence by receiving a reflected beam 125 as described above, but also to receive infrared control signals from a remote control. FIG. 7 depicts an exemplary circuit 200 for demodulating an infrared signal received at a photodiode or other sensor. The incoming signal may be demodulated with a reference voltage 210 to determine whether the signal comprises a reflected beam 125 generated by the emitter 110. Similarly, the incoming signal may be demodulated with a 38 kilohertz reference sine wave 215 to generate output A, and a 38 kilohertz reference cosine wave 220 to generate output B. The combination of outputs A and B may comprise the infrared control signal.

In yet other embodiments, the detector 115 (or, for that matter, the emitter 110) may double as an ambient light detector. Many electronic devices, including notebook computers, employ an ambient light detector to adjust the brightness of a display to local light levels. A photosensitive chip may be masked such that a first portion of the chip's pixels, photodiodes, or other sensors 150 are sensitive to infrared light and a second portion of the chip's sensors are sensitive to visible light. The infrared-sensitive sensors may function to receive reflected signals 125, while the visible light-sensitive sensors may function to detect ambient light. The chip may be masked with two different optical filters to create the desired sensitivities. In some embodiments, one or more sensors 150 may not be optically masked at all.

FIG. 8 generally depicts a two-dimensional emitter 110 and detector 115 having n rows. The detector may be masked in a variety of patterns to perform the multiple functions of ambient light and infrared signal detection. For example, the detector may be masked in a checkerboard pattern, with alternating sensors 150 detecting ambient light and infrared signal. Alternatively, the outer rows and columns of the detector may be sensors configured to detect infrared, while the interior sensors may be configured to detect ambient light.

In yet another embodiment, the detector 115 may simultaneously function as a camera for videoconferencing. In the manner discussed above, a first set of sensors 150 may be masked to function as a video camera, while a second set of sensors is masked to detect reflected infrared beams.

In still another embodiment, the infrared beam 125 emitted by the LEDs 130 may be modulated (and later demodulated) with a wave of a known frequency and phase in such a manner as to provide depth mapping of the object reflecting the beam. Thus, the detector may serve not only to determine a presence, but also to provide and/or reconstruct a three-dimensional depth map of the object.

By incorporating such additional functionality into the emitter 110 and/or detector 115 of the present invention, the number of openings or ports provided in the related device 105 may be minimized. Further, the incorporation of multiple functions into a single chip or array may minimize the overall footprint necessary to perform such functions, as compared to devices employing dedicated elements for each function. Where space is at a premium, as in notebook computers, such spatial minimization may be valuable.

8. Conclusion

Although the present embodiment has been described with reference to particular methods and apparatuses, it should be understood that such methods and apparatuses are merely exemplary. Accordingly, the proper scope of the present invention is defined by the appended claims, and those of ordinary skill in the art will be able to conceive of variations on the methods and apparatuses set forth herein without departing from the spirit or scope of the present invention.

We claim:

1. A method for detecting a presence, comprising:
receiving a beam having an angle of reflection;
in the event the angle of reflection exceeds a minimum angle, electronically determining that an object reflecting the beam is within a detection field; and
in the event the object is within the detection field, activating a related device.

2. The method of claim 1, further comprising emitting the beam at an exit angle from an emitter.

3. The method of claim 2, further comprising receiving the beam at an entry angle at a detector.

4. The method of claim 3, further comprising determining the angle of reflection from the exit and angle the entry angle.

5. The method of claim 4, wherein the operation of determining the angle of reflection comprises:
adding the exit angle to the entry angle to yield a sum; and
equating the angle of reflection to the sum.

6. The method of claim 1, further comprising:
determining if the object is in motion; and
only in the event the object is in motion, activating the related device.

7. The method of claim 6, wherein the operation of determining if the object is in motion comprises:
subjecting the beam to a filter to produce a filtered signal;
from a signal value of the beam and a signal value of the filtered signal, determining if the beam undergoes a change for at least a minimum time; and
in the event the beam undergoes the change for at least the minimum time, determining the object is in motion.

8. The method of claim 6, wherein the operation of activating the related device comprises waking the related device.

9. The method of claim 8, wherein the related device is a computer.

10. The method of claim 1, wherein the detection field is a less than the maximum detectable area.

11. An apparatus for detecting a presence, comprising:
an emitter operative to project a beam;
a detector operative to receive the beam; and
a logic operative to determine whether the beam is reflected from an object within a detection field associated with the emitter by determining if an angle of reflection of the beam exceeds a minimum angle.

12. The apparatus of claim 11, wherein the emitter emits an infrared beam.

13. The apparatus of claim 11, wherein the emitter emits visible light.

14. The apparatus of claim 11, wherein the emitter emits ultraviolet light.

15. The apparatus of claim 11, wherein the emitter emits a steered laser.

16. The apparatus of claim 11, wherein the emitter comprises at least one light-emitting diode.

17. The apparatus of claim 16, wherein the detector comprises at least one sensor operable to detect the beam emitted by the light-emitting diode.

18. The apparatus of claim 11, wherein:
the emitter comprises a plurality of light-emitting diodes arranged in an emitter pattern;
the detector comprises a plurality of sensors arranged in a detector pattern complementary to the pattern of the emitter; and
the detector is operative to scan at least a first sensor upon actuation of one of the plurality of light-emitting diodes.

19. The apparatus of claim 18, wherein:
the emitter pattern is a two-dimensional array;
the detector pattern is a two-dimensional array;
the emitter is operative to actuate each of the light-emitting diodes in the two-dimensional array sequentially; and
the detector is operative to scan each of the sensors having at least one common coordinate with each of the light-emitting diodes as each of the light-emitting diodes is actuated.

20. The apparatus of claim 19, wherein the logic is operative to determine whether the beam is reflected from an object within a detection field associated with the emitter by determining an angle of reflection for the beam, and employing the angle of reflection to triangulate a location of the object.

21. The apparatus of claim 20, wherein:
the logic is further operative to measure a duration of a change associated with the beam; and the logic is operative to activate the related device in the event the duration of the change exceeds a threshold value.

22. The apparatus of claim 11, wherein:
the detector is further operative to detect a level of ambient light; and
the detector is further operative to adjust a parameter of the related device to accommodate the level of ambient light.

23. The apparatus of claim 11, wherein the detector is further operative to act as a videoconferencing camera.

24. A computer operative to detect a presence, comprising:
an emitter comprising at least one light-emitting diode, the light-emitting diode operative to project a beam at an exit angle;
a detector comprising at least one sensor, the sensor operative to receive the beam at an entry angle after the beam reflects off an object;
a logic operative to determine an angle of reflection based on the exit angle and entry angle, the logic further operative to determine if the object is in motion, the logic further operative to determine the object is present if the object is in motion and if the object is within a detection field based on the angle of reflection exceeding a minimum angle.

25. The computer of claim 24, wherein the parameter of the computer system is a power state.

26. The computer of claim 24, wherein the computer is a notebook computer.

27. The computer of claim 24, wherein the computer is a desktop computer.

28. A method for detecting a presence, comprising:
receiving a beam having an angle of reflection;
comparing the angle of reflection to a minimum angle of reflection;
in the event the angle of reflection at least one of equals or exceeds the minimum angle of reflection, determining the object is within the detection field; and
in the event the object is within the detection field, activating a related device.

29. The method of claim 28, wherein the minimum angle of reflection equals an arctangent of the detection field's width divided by the detection field's depth.

30. A method for detecting a presence, comprising:
receiving a beam having an angle of reflection;
in the event the angle of reflection is less than a minimum angle, electronically determining that an object reflecting the beam is not within a detection field; and
in the event the object is within the detection field, activating a related device.

* * * * *

UNITED STATES PATENT AND TRADEMARK OFFICE
CERTIFICATE OF CORRECTION

PATENT NO. : 7,599,044 B2
APPLICATION NO. : 11/165958
DATED : October 6, 2009
INVENTOR(S) : Hotelling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 739 days.

Signed and Sealed this

Twenty-eighth Day of September, 2010

David J. Kappos
*Director of the United States Patent and Trademark Office*